(12) United States Patent
Mese et al.

(10) Patent No.: US 9,768,843 B2
(45) Date of Patent: Sep. 19, 2017

(54) MASSIVE MIMO (M-MIMO) SUPPORT FOR HETEROGENEOUS NETWORKS (HETNETS)

(71) Applicant: Broadcom Corporation, Irvine, CA (US)

(72) Inventors: Murat Mese, Ranchos Palos Verdes, CA (US); Yan Wang, Plano, TX (US); Nihar Jindal, Mountain View, CA (US); Louay Jalloul, San Jose, CA (US); Arogyaswami Paulraj, Stanford, CA (US); Amin Mobasher, Sunnyvale, CA (US); Sirikiat Ariyavisitakul, Alpharetta, GA (US); James Bennett, Hroznetin (CZ); Sam Alex, Sunnyvale, CA (US)

(*) Notice: Subject to any disclaimer, the term of this patent is extended or adjusted under 35 U.S.C. 154(b) by 57 days.

(21) Appl. No.: 14/222,202

(22) Filed: Mar. 21, 2014

(65) Prior Publication Data

US 2014/0307702 A1    Oct. 16, 2014

Related U.S. Application Data

(60) Provisional application No. 61/811,572, filed on Apr. 12, 2013, provisional application No. 61/813,337, filed on Apr. 18, 2013.

(51) Int. Cl.
| | | |
|---|---|---|
| H04B 7/04 | (2017.01) | |
| H04B 7/0456 | (2017.01) | |
| H04B 7/0413 | (2017.01) | |
| H04B 7/06 | (2006.01) | |

(52) U.S. Cl.
CPC ......... *H04B 7/0456* (2013.01); *H04B 7/0413* (2013.01); *H04B 7/0617* (2013.01); *H04B 7/0691* (2013.01)

(58) Field of Classification Search
CPC .................................................. H04B 7/0456
See application file for complete search history.

(56) References Cited

U.S. PATENT DOCUMENTS

| | | | | |
|---|---|---|---|---|
| 2008/0181183 | A1* | 7/2008 | Gale | H01Q 1/246 370/336 |
| 2012/0207084 | A1* | 8/2012 | Seo | H04B 7/155 370/315 |
| 2012/0300654 | A1* | 11/2012 | Gan | H04B 7/155 370/252 |
| 2014/0073337 | A1* | 3/2014 | Hong | H04W 16/28 455/452.1 |
| 2014/0105048 | A1* | 4/2014 | Tellado | H04W 24/10 370/252 |
| 2014/0126667 | A1* | 5/2014 | Kwun | H04B 7/0413 375/295 |
| 2015/0304014 | A1* | 10/2015 | Sadeghi | H04J 13/004 370/315 |

* cited by examiner

*Primary Examiner* — Jason Mattis
(74) *Attorney, Agent, or Firm* — Sterne, Kessler, Goldstein & Fox P.L.L.C.

(57) ABSTRACT

Systems and methods for enabling a wireless backhaul network between access points (APs) in a wireless network are provided. In an embodiment, the wireless backhaul network is enabled using a Massive Multiple Input Multiple Output (MIMO) radio access technology (RAT). In another embodiment, the wireless backhaul network is established using the same RAT as used by the APs to serve user devices, and can utilize the same time and frequency resources used for user communication.

29 Claims, 12 Drawing Sheets

US 9,768,843 B2

MASSIVE MIMO (M-MIMO) SUPPORT FOR HETEROGENEOUS NETWORKS (HETNETS)

CROSS-REFERENCE TO RELATED APPLICATION(S)

The present application claims the benefit of U.S. Provisional Application No. 61/811,572, filed Apr. 12, 2013, which is incorporated herein by reference in its entirety.

TECHNICAL FIELD

The present disclosure relates generally to wireless networks using a Massive Multiple Input Multiple Output (M-MIMO) radio access technology (RAT) to support backhaul communication.

BACKGROUND

Background Art

In a Massive Multiple Input Multiple Output (M-MIMO) communication system, a transmitter, such as an Access Point (AP) or base station, is equipped with a very large number of transmit antennas (e.g., 32, 64, or 100) that can be used simultaneously for transmission to one or more receivers, such as a user equipment (UE).

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 7:
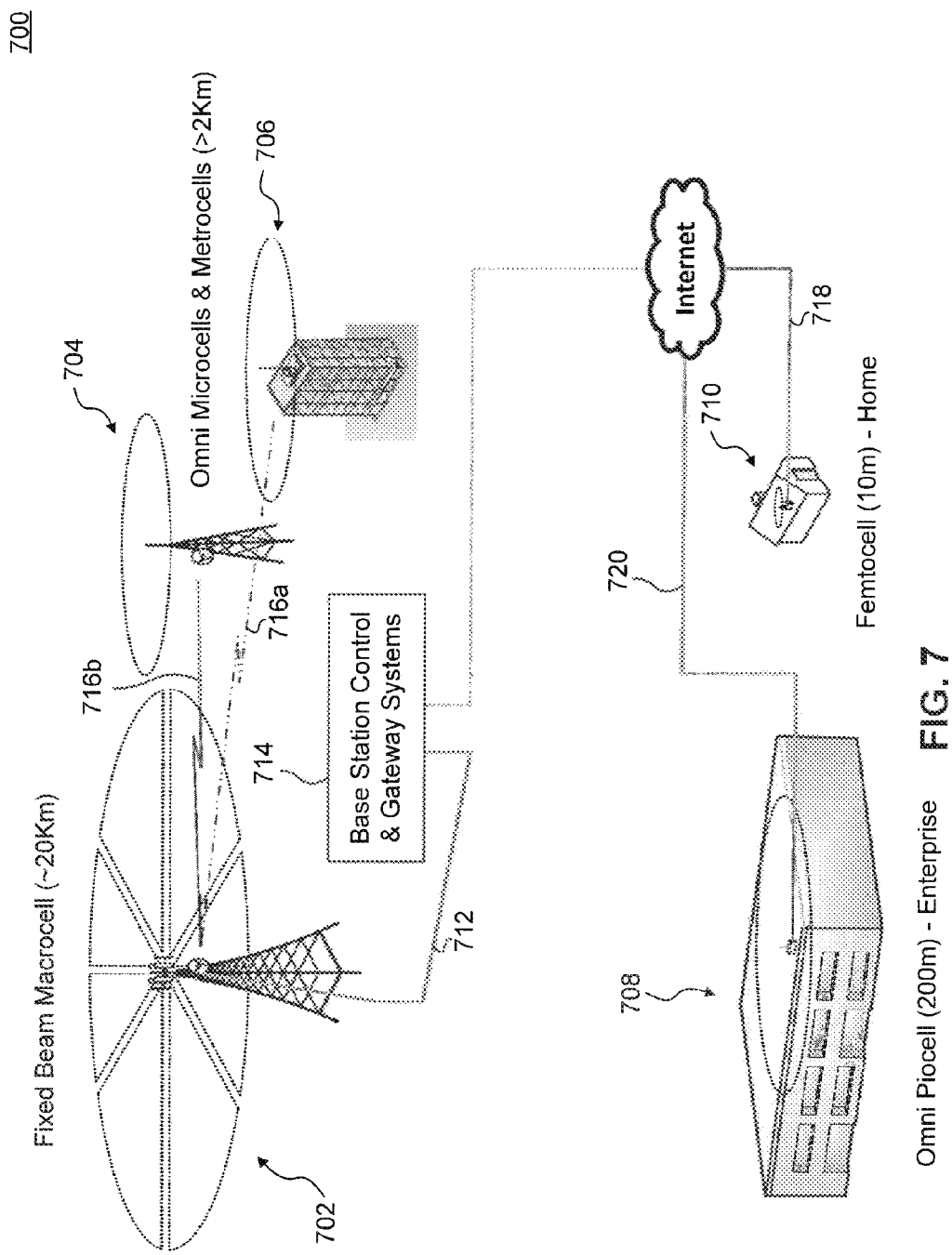
FIG. 7 illustrates an example multi-access radio network in which embodiments can be practiced or implemented.

FIG. 7 illustrates an example multi-access radio network 700 in which embodiments can be implemented or practiced. Example radio network 700 is provided for the purpose of illustration only and is not limiting of embodiments. As shown in FIG. 7, example radio network 700 includes, without limitation, a macrocell access point (AP) 702, a microcell AP 704, a metrocell AP 706, a picocell AP 708, a femtocell AP 710, and base station control & gateway systems 714.

In an embodiment, AP 702 can be a fixed beam macrocell, which connects to base station control & gateway systems 714 via a wired backhaul link 712. Wired backhaul link 712 can be a coaxial, fiber, or hybrid coaxial-fiber link, for example. In an embodiment, APs 704 and 706 can be omni-directional APs. As shown in FIG. 7, APs 704 and 706 connect to AP 702 via microwave links 716b and 716a respectively to so they can use backhaul link 712 for their respective backhaul traffic. APs 708 and 710 can also be omni-directionals APs. In an embodiment, APs 708 and 710 connect to base station control & gateway systems 714 via Internet connections 720 and 718 respectively for their respective backhaul traffic. As further described below, in other embodiments, a wireless backhaul network can be established between APs 702, 704, 706, 708, and 710, thereby reducing the infrastructure (e.g., fiber links, microwave links, Internet connections, etc.) needed to transport backhaul traffic.

Figure 1:
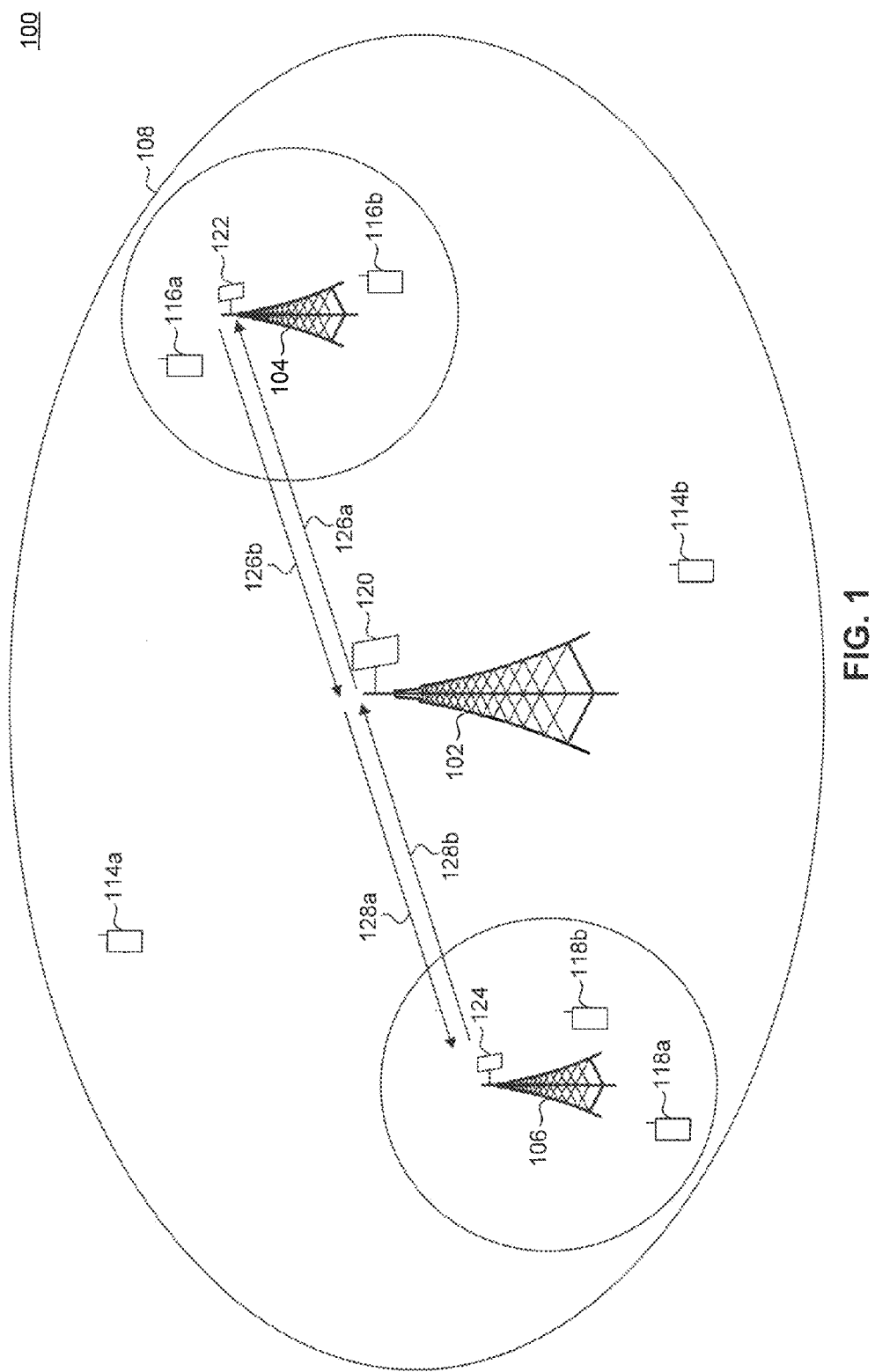
FIG. 1 illustrates an example environment in which embodiments can be implemented or practiced.

FIG. 1 illustrates an example environment 100 in which embodiments can be implemented or practiced. Example environment 100 is provided for the purpose of illustration only and is not limiting of embodiments. As shown in FIG. 1, example environment 100 includes a first Access Point (AP) 102, a second AP 104, and a third AP 106 and a plurality of user devices 114a, 114b, 116a, 116b, 118a, and 118b.

APs 102, 104, and 106 can be Wireless Local Area Network (WLAN) APs, cellular network base stations, Bluetooth APs, or other wireless multi-access radio network APs. APs 102, 104, and 106 have respective coverage areas 108, 110, and 112. In an embodiment, as shown in FIG. 1, coverage areas 110 and 112 of APs 104 and 106 are within coverage area 108 of AP 102. For example, APs 104 and 106 may be low power APs (e.g., femtocells) that are located within coverage area 108 of a high power AP (e.g., macrocell) 102. However, embodiments are not limited by this example. In other embodiments, any of APs 102, 104, and 106 can be a low power or a high power AP. Further, any of coverage areas 110 and 112 of APs 104 and 106 may intersect only partially or not intersect with coverage 108 of AP 102. When APs 102, 104, and 106 have differing capabilities (e.g., macrocell/femtocell), example environment 100 includes a heterogeneous network (HETNET).

User devices 114a, 114b, 116a, 116b, 118a, and 118b can be WLAN user stations (STAB), cellular user equipments (UEs), Bluetooth devices, and/or other wireless radio access technology (RAT) devices. In an example embodiment, as shown in FIG. 1, user devices 114a, 114b, 116a, 116b, 118a, and 118b are located within coverage area 108 of AP 102. Further, user devices 116a and 116b are located within coverage area 110 of AP 104, and user devices 118a and 118b are located within coverage area 112 of AP 106.

In an embodiment, APs 102, 104, and 106 work cooperatively to serve user devices 114a, 114b, 116a, 116b, 118a, and 118b. For example, AP 102 and AP 104 may determine which amongst them should primarily serve (e.g., be the primary cell for) user devices 116a and 116b. In another example, AP 102 and AP 106 may jointly serve one or more of user devices 118a and 118b (e.g., using Cooperative Multiple Point (COMP) as defined by the Long Term Evolution (LTE) standard). In a further example, where AP 102 is a macrocell and AP 104 is a femtocell, AP 104 provides wireless connections for user devices 116a and 116b and acts as a relay for user traffic between AP 102 and user devices 116a and 116b.

Conventionally, to support the above described example scenarios, among others, APs 102, 104, and 106 are coupled via a wired backhaul network (not shown in FIG. 1). The wired backhaul network provides a high speed communication interface between APs 102, 104, and 106 to support transfer of control and/or user traffic between APs 102, 104, and 106 as necessary to enable cooperative user service. Traffic transported over the backhaul network is generally referred to as backhaul traffic. Generally, however, a wired backhaul network can require significant infrastructure to setup or to extend to include a newly installed AP. An alternative solution uses microwave links between APs 102, 104, and 106 to provide the backhaul network, which necessitates the availability of microwave transceivers at each of APs 102, 104, and 106. The microwave links are typically established in a different frequency band than the ones used by APs 102, 104, and 106 to communicate with their respectively served user devices.

In an embodiment, the backhaul network between APs 102, 104, and 106 is provided via the same wireless RAT(s) as used to support wireless service within coverage area 108. For example, where APs 102, 104, and 106 are LTE base stations, the backhaul network is also provided using LTE. Being wireless, the backhaul network according to embodiments can be readily scaled to add or remove an AP from the network. And by using the same wireless RAT(s) as employed to serve users, the need for additional transceiver equipment, such as microwave transceivers, at APs 102, 104, and 106 can be reduced or eliminated. In a further embodiment, the backhaul network is provided within the same frequency band used for user communication, thereby requiring lower overall frequency bandwidth.

In one embodiment, as further described below, the wireless backhaul network is established using M-MIMO enabled wireless links between APs 102, 104, and 106. For example, in an embodiment, APs 102, 104, and 106 each includes a respective M-MIMO antenna array 120, 122, and 124. M-MIMO antenna arrays 120, 122, and 124 each comprises a respective plurality of antenna elements. M-MIMO antenna arrays 120, 122, and 124 can be uniform arrays (1D, 2D, or 3D), with uniform spacing between antenna elements, or non-uniform arrays. The number of antenna elements of M-MIMO antenna arrays 120, 122, and 124 is significantly larger than the number of antenna elements used in existing base station implementations (which can be up to 8 antenna elements). For example, M-MIMO antenna arrays 120, 122, and 124 can have 16, 32, 64 or more antenna elements.

Using M-MIMO antenna arrays 120, 122, and 124, APs 102, 104, and 106 can establish a M-MIMO enabled wireless backhaul network. For example, in an embodiment, APs 102 and 104 establish M-MIMO enabled wireless links 126a and 126b to enable full duplex communication between them. Similarly, APs 102 and 106 establish M-MIMO enabled wireless links 128a and 128b to enable full duplex communication between them. In another embodiment, APs 104 and 106 can also establish M-MIMO enabled links between them. In an embodiment, as further described below, the M-MIMO enabled wireless backhaul network is supported by APs 102, 104, and 106 on the same time and frequency resources, using the same RAT(s), and/or using the same M-MIMO antenna array elements as used to support downlink/uplink communication with user devices.

In an embodiment, to establish M-MIMO enabled wireless link 126a, for example, AP 102 learns the downlink channel to AP 104 (e.g., using pilot signals transmitted by AP 104) and then uses the downlink channel knowledge to beamform transmissions to AP 104. The beamforming of transmissions is made possible by the availability of a very large number of antenna elements within M-MIMO antenna array 120 of AP 102, and can be configured to realize a very high transmission data rate to AP 104. Generally, because APs 102, 104, and 106 are fixed, channels between them change slowly and thus obtaining channel knowledge at APs 102, 104, and 106 as necessary to enable the M-MIMO enabled wireless backhaul network does not consume significant frequency bandwidth or processing resources. Other M-MIMO enabled wireless links, e.g., 126b, 128a, and 128b, can be established in a similar fashion as described for wireless link 126a as would be apparent to a person of skill in the art.

Figure 8:
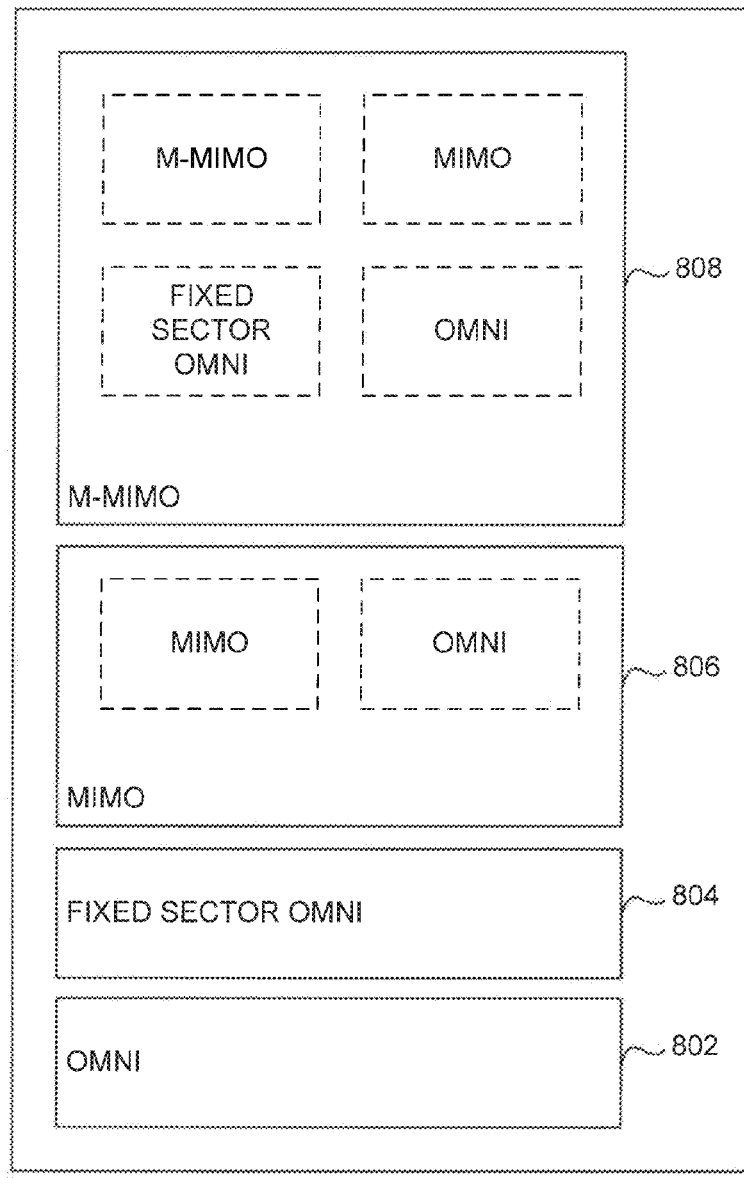
FIG. 8 illustrates an example AP antenna system according to an embodiment.

In another embodiment, at least one of the wireless links of the wireless backhaul network can be enabled without using M-MIMO. For example, in an embodiment, any one of APs 102, 104, and 106 can include an antenna system 800 as shown in FIG. 8. According to antenna system 800, the AP can include an omni-directional antenna module 802, a fixed sector omni-directional antenna module 804, a MIMO antenna module 806, and a M-MIMO antenna module 808. In other embodiments, the AP can include some but not all of modules 802, 804, 806, and 808. In an embodiment, MIMO module 806 can be configured to support MIMO communication and/or omni-directional communication. M-MIMO antenna module can be configured to support M-MIMO communication, MIMO communication, fixed sector omni-directional communication, and/or omni-directional communication. Using antenna system 800, the AP thus can establish omni-directional links, fixed sector omni-directional links, MIMO links, and/or M-MIMO links with another AP, depending on the antenna capabilities of the other AP.

Figure 2:
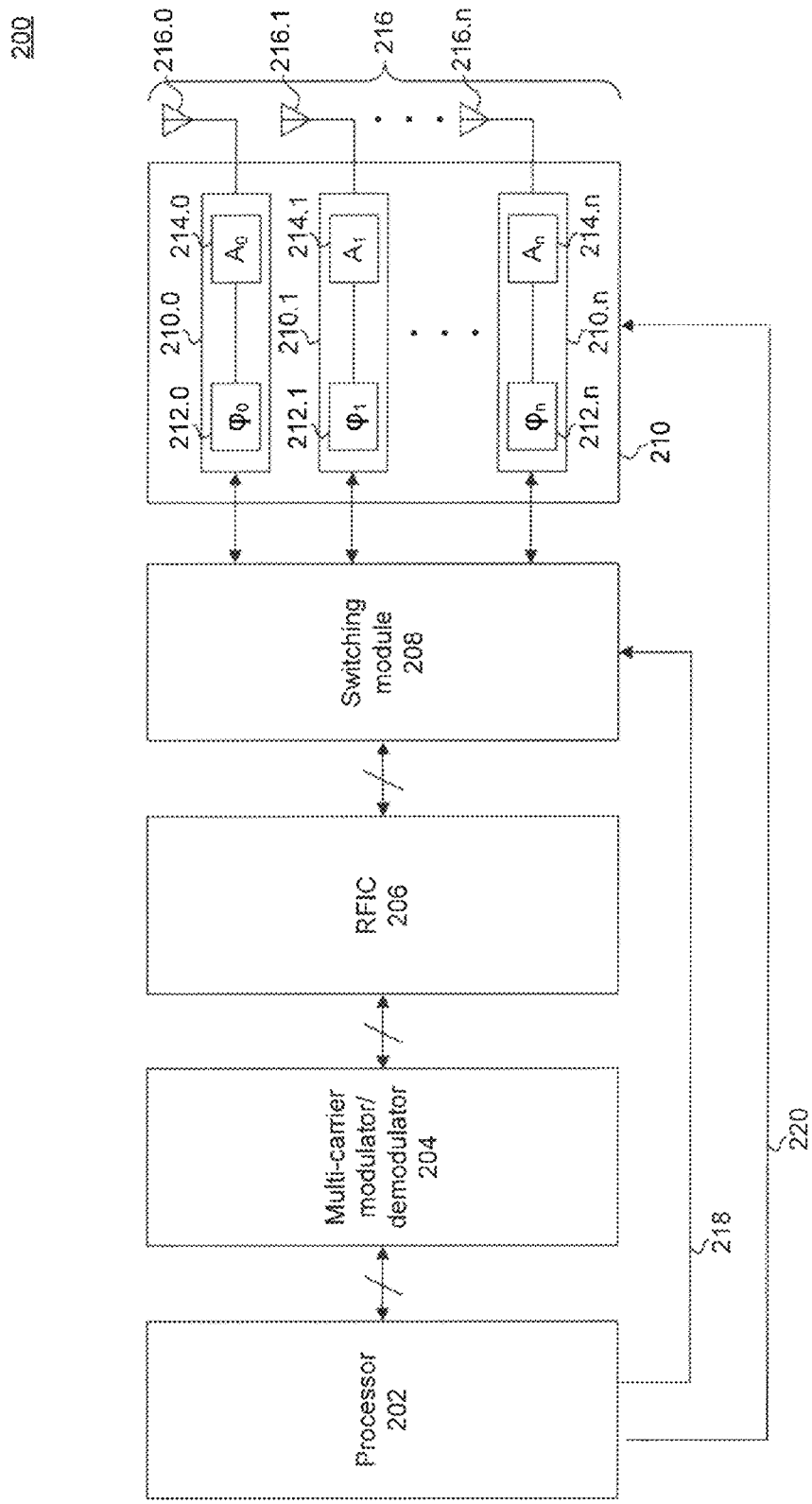
FIG. 2 illustrates an example Access Point (AP) according to an embodiment.

FIG. 2 illustrates an example Access Point (AP) 200 according to an embodiment. Example AP 200 is provided for the purpose of illustration only and is not limiting of embodiments. Example AP 200 may be an embodiment of AP 102, AP 104, or AP 106 discussed above in example environment 100. For the purpose of illustration only, AP 200 is described below as an embodiment of AP 102.

As shown in FIG. 2, example AP 200 includes, without limitation, a processor 202; a multi-carrier modulator/demodulator 204; a radio frequency integrated circuit (RFIC) 206; a switching module 208; an antenna array controller 210, comprising a plurality of antenna controllers 210.1, . . . , 210.n; and a M-MIMO antenna array 216, comprising a plurality of antenna elements 216.0, . . . ,

216.n. In an embodiment, AP 200 further includes a memory (which can be embedded within processor 202 or external to processor 202) for storing logic instructions that, when executed by processor 202, enable processor 202 to perform the functions described herein.

In an embodiment, processor 202 includes a baseband processor which generates one or more (e.g., N) symbol streams (not shown in FIG. 2) for transmission by AP 200 over the same time and frequency resources. The symbol streams each typically comprise a sequence of modulated symbols. The symbol streams can be different from each other. Alternatively, some of the symbol streams can be duplicate.

The symbol streams are generally intended for one or more user devices (e.g., K UEs) served by AP 200. For example, referring to FIG. 1, the one or more user devices may be one or more of user devices 114a and 114b served by AP 102. A user device served by AP 200 may be the intended recipient of one or more or none of the symbol streams transmitted by AP 200 at any given time. For example, referring to FIG. 1, user device 114a may be the intended recipient of a single symbol stream of the N symbol streams and accordingly is said to have a rank equal to 1. Alternatively, user device 114a may be the intended recipient of two symbol streams of the N symbol streams and accordingly is said to have a rank equal to 2. Symbol streams intended for user devices are referred to herein as user data symbol streams. User data symbol streams can include data and/or user-specific control information.

In an embodiment, the symbol streams additionally include one or more backhaul symbol streams comprising backhaul information. A backhaul symbol stream is intended for another AP. For example, referring to FIG. 1, the symbol streams can include a backhaul symbol stream intended for AP 104 and another backhaul symbol stream intended for AP 106. As described above, backhaul information can include control information intended for the other AP itself and/or user traffic intended for a user device served by the other AP. For example, referring to FIG. 1, a backhaul symbol stream transmitted from AP 102 to AP 104 can include control information for AP 104 and/or user traffic for user device 116a, for example, served by AP 104.

In an embodiment, symbol streams, including a user data symbol and a backhaul symbol stream, are generated by processor 202. For example, referring to FIG. 1, the symbol streams can include a user data symbol stream for user device 114a and a backhaul symbol stream for AP 104. As would be understood by a person of skilled in the art based on the teachings, the symbol streams can include any number of user data symbol streams and any number of backhaul symbol streams according to embodiments.

The symbol streams are provided to multi-carrier modulator/demodulator 204. In an embodiment, multi-carrier modulator/demodulator 204 includes an Inverse Fast Fourier Transform (IFFT) module and an Fast Fourier Transform (FFT) module. Multi-carrier modulator/demodulator 204 modulates the symbol streams onto one or more physical resources of a multi-carrier frame (e.g., Orthogonal Frequency Division Multiplexing (OFDM) frame) at the control of processor 202. In an embodiment, the user data symbol stream and the backhaul symbol stream are modulated onto different physical resources of the multi-carrier frame. As such, the user data symbol stream and the backhaul symbol stream occupy different time slots (symbols) and/or frequency subcarriers of the multi-carrier frame. This means that the user data symbol stream and the backhaul symbol stream are transmitted over orthogonal physical resources in time and/or frequency.

In another embodiment, the user symbol stream and the backhaul symbol stream are modulated onto the same time and frequency physical resources of the multi-carrier frame, but are pre-coded in such a manner that they are transmitted on spatially orthogonal paths by M-MIMO antenna array 216. As further described below, in embodiments, the pre-coding can be performed by applying a transmit precoder matrix to the symbol streams before multi-carrier modulation and/or by applying a transmit weight vector to the antenna signals prior to transmission. In the former case, the pre-coding can be performed on a physical resource basis, a sub-carrier basis, or a timeslot basis (e.g., OFDM symbol basis). In the latter case, the pre-coding is applied in the time domain on a multi-carrier modulated signal.

In an embodiment, processor 202 selects a subset of M-MIMO antenna array 216 (which can be the entire M-MIMO antenna array 216) for transmitting the user data symbol stream and the backhaul symbol stream. Based on the size of the selected subset of M-MIMO antenna array 216 and the number of symbol streams being transmitted (two in this example), processor 202 determines a transmit precoder matrix for pre-coding the user data symbol stream and the backhaul symbol stream. For example, assume that the selected subset of M-MIMO antenna array 216 includes 16 elements, then processor 202 determines the transmit precoder matrix to be of size 16×2. In an embodiment, the transmit precoder matrix depends on the geometry of the selected subset such that a desired transmit beam pattern is produced from the precoding.

Processor 202 then pre-codes the user data symbol stream and the backhaul symbol stream using the transmit precoder matrix to generate a plurality of signals. In the example described above, pre-coding the user data symbol stream and the backhaul symbol stream using a 16×2 transmit precoder matrix results in 16 signals. Depending on the actual values of the transmit precoder matrix, the plurality of signals can each correspond to an amplitude and/or phase adjusted version of a single symbol stream (i.e., the user data symbol stream or the backhaul symbol stream), or one or more of the plurality of signals can be a weighted combination of the user data symbol stream and the backhaul symbol stream.

In an embodiment, processor 202 is configured to determine the transmit precoder matrix based on one or more of: a first channel estimate of a first downlink channel from AP 200 to user device 114a, and a second channel estimate of a second downlink channel from AP 200 to the AP 104. In an embodiment, processor 202 determines the first and second channel estimates from pilots transmitted by user device 114a and AP 104.

In another embodiment, processor 202 determines the transmit precoder matrix such that transmission of the plurality of signals by M-MIMO antenna array 216 results in the user data symbol stream being beamformed to user device 114a and the backhaul symbol stream being beamformed to AP 104. In embodiments, the widths of the directional beams formed as a result of the beamforming is configurable. For example, the backhaul symbol stream and the user data symbol stream can be beamformed using varying width beams. In another example, the backhaul symbol stream can be beamformed using a narrower beam than the user data symbol stream. Generally, this can be performed by varying the transmit precoder matrix and/or the size of the selected subset of M-MIMO antenna array 216 used for transmission.

In an embodiment, processor 202 forms a concatenated downlink channel estimate that includes as its elements the first channel estimate from AP 200 to user device 114*a* and the second channel estimate from AP 200 to AP 104. As would be understood by a person of skill in the art, the size of a downlink channel estimate from AP 200 to a user device or AP is a function of the size of the selected subset of M-MIMO antenna array 216 used for the transmission and the number of receive antenna elements at the user device or AP. In an embodiment, user device 114*a* and AP 104 use the same number of receive antenna elements. In another embodiment, user device 114*a* and AP 104 can have different numbers of receive antenna elements. To accommodate this variation, in an embodiment, processor 202 assumes that user device 114*a* and AP 104 have the same number of receive antenna elements equal to the larger of the number of receive antenna elements at user device 114*a* and the number of receive antenna elements at AP 104. Processor 202 then augments the first or the second channel estimate (depending on which of user device 114*a* or AP 104 has the larger number of receive antenna elements) by adding a row of zeros for each inexistent receive antenna element. For example, assuming that AP 104 has one more receive antenna element than user device 114*a*, then processor 202 augments the first channel estimate by adding a row of zeros to the matrix representing the first channel estimate. Processor 202 then concatenates the augmented first channel estimate and the second channel estimate to form the concatenated downlink channel estimate. Processor 202 then determines the transmit precoder based on the concatenated downlink channel. In an embodiment, processor 202 determines or selects the transmit precoder matrix such that when multiplied by the concatenated downlink channel results in a diagonal matrix. This effectively creates spatially orthogonal downlink paths from the selected subset of M-MIMO antenna array 216 to user device 114*a* and AP 104, so that interference between the two channels is reduced or even eliminated.

Figure 3A:
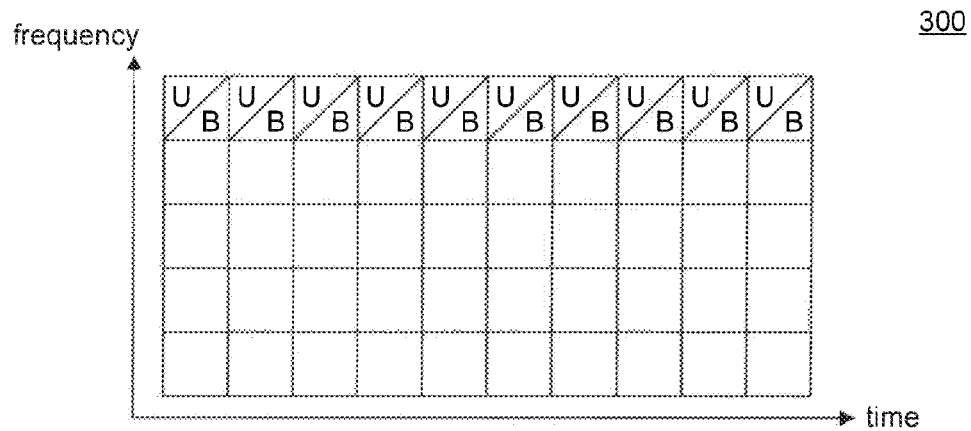
FIGS. 3A-3C illustrate example multi-carrier data frames according to embodiments.
Figure 3B:
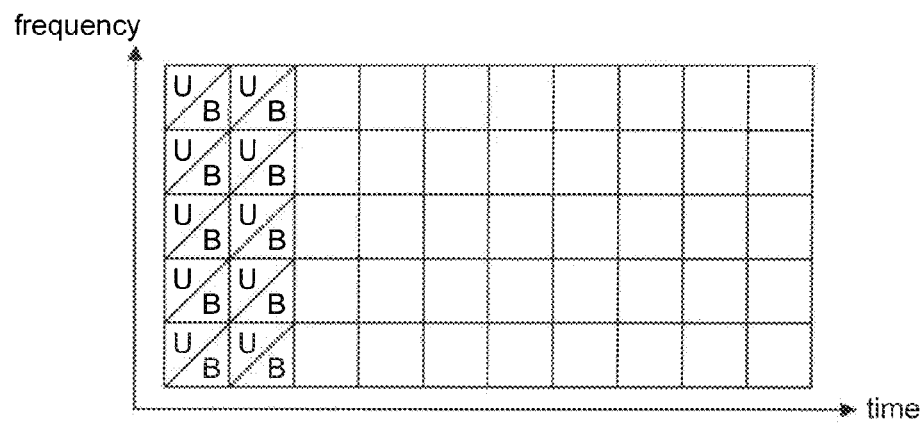
Figure 3C:
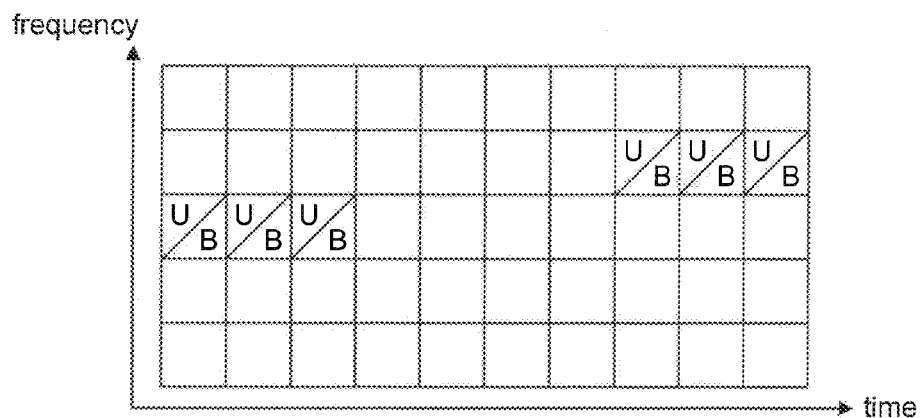

The plurality of signals resulting from the pre-coding of the user data symbol stream and the backhaul symbol stream are provided by processor 202 to multi-carrier modulator/demodulator 204. Multi-carrier modulator/demodulator 204 modulates the plurality of signals onto the same time and frequency resources. This is equivalent to having multiple parallel (time and frequency synchronized) OFDM frames, with each signal of the plurality of signals being mapped to one of the multiple parallel OFDM frames such that all signals occupy in their respective OFDM frames the same time and frequency resources. FIGS. 3A-3C illustrate examples of modulating the user data symbol stream and the backhaul symbol stream according to embodiments. These examples are provided for the purpose of illustration and are not limiting of embodiments. For the purpose of illustration only, it is assumed that the OFDM frame is composed of 5 subcarriers and 10 time slots or OFDM symbols.

In FIG. 3A, the user data symbol stream (denoted by "U") and the backhaul symbol stream (denoted by "B") are mapped to a same subcarrier (e.g., highest frequency subcarrier) of the OFDM frame. Other subcarriers of the OFDM frame can be used to transmit to other user devices served by AP 200. The other subcarriers can be divided in time, frequency, and/or spatially between the other user devices. In an embodiment, the backhaul symbol stream is transported on one or more dedicated sub-carriers of the OFDM frame, for example the highest frequency subcarrier as shown in FIG. 3A. The one or more dedicated subcarriers can be fixed (always the highest frequency subcarrier) or variable in frequency.

In FIG. 3B, the user data symbol stream and the backhaul symbol stream are mapped to the same OFDM symbols of the OFDM frame. Other OFDM symbols of the OFDM frame can be used to transmit to other user devices served by AP 200. The other OFDM symbols can be divided in time, frequency, and/or spatially between the other user devices. In an embodiment, the backhaul symbol stream is transported on one or more dedicated OFDM symbols of the OFDM frame, for example the first two OFDM symbols as shown in FIG. 3B. The one or more dedicated OFDM symbols can be fixed (e.g., always the first two OFDM symbols) or variable in time.

In FIG. 3C, the user data symbol stream and the backhaul symbol stream are mapped to the same time and frequency physical resources, which can occur over one or more subcarriers and over multiple OFDM symbols. Other physical resources of the OFDM frame can be used to transmit to other user devices served by AP 200. The other physical resources of the OFDM frame can be divided in time, frequency, and/or spatially between the other user devices. According to this embodiment, the number/location of physical resources of the OFDM frame used for both the user data symbol stream and the backhaul symbol stream can vary from one OFDM frame to another depending on the availability of backhaul traffic needing transmission.

Returning to FIG. 2, the plurality of signals modulated by multi-carrier modulator/demodulator 204 are provided to RFIC 206. RFIC 206 includes analog components such as filters, frequency up-converters, and power amplifiers. RFIC 206 acts on the plurality of signals to generate a respective plurality of carrier-modulated signals. The plurality of carrier-modulated signals are then provided to switching module 208. Switching module 208 is controllable by processor 202 by means of a control signal 218 to couple the plurality of carrier-modulated signals to M-MIMO antenna array 216. In an embodiment, processor 202 controls switching module 208 to couple the plurality of carrier-modulated signals to respective antenna elements of the selected subset of M-MIMO antenna array 216. In an embodiment, switching module 208 couples the plurality of carrier-modulated signals to M-MIMO antenna array 216 via antenna array controller 210 as further described below.

Antenna array controller 210 is coupled between switching module 208 and M-MIMO antenna array 216. In an embodiment, antenna array controller 210 includes a plurality of antenna controllers 210.0, 210.1, . . . , 210.*n* that correspond respectively to antenna elements 216.0, 216.1, . . . , 216.*n* of M-MIMO antenna array 216. In an embodiment, each antenna controller 210.0, 210.1, . . . , 210.*n* includes a respective phase controller 212 and a respective amplitude controller 214. Antenna array controller 210 can be implemented using digital and/or analog components.

In an embodiment, processor 202 controls antenna array controller 210 by means of a control signal 220. In another embodiment, processor 202 controls antenna array controller 210 using control signal 220 to activate one or more of antenna controllers 210.0, 210.1, . . . , 210.*n* depending on which of antenna elements 216.0, 216.1, . . . , 216.*n* is being used for transmission or reception. In an embodiment, when an antenna element 216.0, 216.1, . . . , 216.*n* is used for transmission or reception, its corresponding antenna controller 210.0, 210.1, . . . , 210.*n* is active. A phase shift can be applied to a signal being transmitted or received by an antenna element 216.0, 216.1, . . . , 216.n using its respective phase controller 212.0, 212.1, . . . , 212.n. An amplitude amplification/attenuation can be applied to a signal being transmitted or received using an antenna element 216.0, 216.1, . . . , 216.n using its respective amplitude controller 214.0, 214.1, . . . , 214.n. In an embodiment, the phase shift and amplitude amplification/attenuation are applied in the time domain to the signal.

In an embodiment, processor 202 determines, based on one or more of: the desired transmit beam pattern, the downlink channel, the transmit precoder matrix, and the selected subset of antenna elements used for transmission, a transmit weight vector for antenna array controller 210. In an embodiment, the transmit weight vector includes a complex element for each antenna controller 210.0, 210.1, . . . , 210.n, which determines the respective phase shift and amplitude amplification/attenuation to be applied by the antenna controller to the signal being transmitted by its respective antenna element. Hence, as described above, antenna array controller 210 provides an additional layer for shaping the transmit beam pattern of M-MIMO antenna array 216, and can be used with or without the above described symbol stream precoding to realize a desired transmit beam pattern using M-MIMO antenna array 216. The desired transmit beam pattern can be, as described above, such that the user data symbol stream is beamformed to user device 114a and the backhaul symbol stream is beamformed to AP 104.

After processing by antenna array controller 210, the plurality of carrier-modulated signals are coupled to respective antenna elements of the selected subset of M-MIMO antenna array 216 and are transmitted. The selected subset of M-MIMO antenna array transmits the plurality of carrier-modulated signals on the same time and frequency physical resources as described above.

Figure 4:
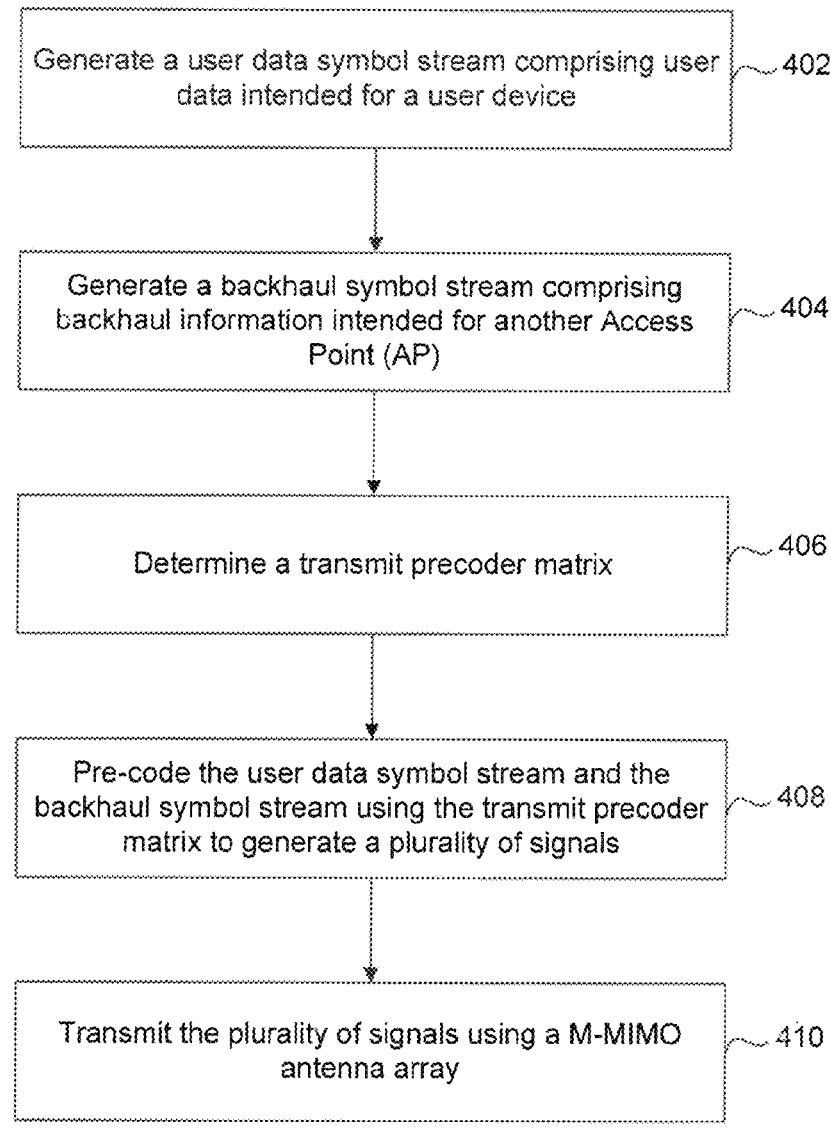
FIG. 4 illustrates an example process according to an embodiment.

FIG. 4 illustrates an example process 400 according to an embodiment. Example process 400 is provided for the purpose of illustration only and is not limiting of embodiments. Example process 400 can be performed by an AP having a M-MIMO antenna array, such as AP 200, AP 102, AP 104, or AP 106, for example.

As shown in FIG. 4, process 400 begins in step 402, which includes generating a user data symbol stream comprising user data intended for a user device. In an embodiment, the user data symbol stream is intended for a user device served directly by the AP. Then, in step 404, process 400 includes generating a backhaul symbol stream comprising backhaul information intended for another AP. As described above, backhaul information can include control information intended for the other AP itself and/or user traffic intended for a user device served by the other AP. For example, referring to FIG. 1, a backhaul symbol stream transmitted from AP 102 to AP 104 can include control information for AP 104 and/or user traffic for user device 116a, for example, served by AP 104. As would be understood by a person of skill in the art based on the teachings herein, in other embodiments, step 404 can be performed before or at the same time as step 402.

Process 400 then proceeds to step 406, which includes determining a transmit precoder matrix. In an embodiment, step 406 further includes determining the transmit precoder matrix based on one or more of a first channel estimate of a first downlink channel from the AP to the user device for which the user data symbol stream is intended, and a second channel estimate of a second downlink channel from the AP to the other AP for which the backhaul symbol stream is intended. Then, in step 408, process 400 includes pre-coding the user data symbol stream and the backhaul symbol stream using the transmit precoder matrix to generate a plurality of signals. In an embodiment, the transmit precoder matrix is determined such that transmission of the plurality of signals by the M-MIMO antenna array results in the user data symbol stream being beamformed to the user device and the backhaul symbol stream being beamformed to the other AP.

Process 400 terminates in step 410, which includes transmitting the plurality of signals using the M-MIMO antenna array. In an embodiment, step 410 further includes modulating the plurality of signals onto the same time and frequency physical resources of a multi-carrier frame. In another embodiment, step 410 also includes selecting a subset of the M-MIMO antenna array, coupling the plurality of signals to respective antenna elements of the subset of the M-MIMO antenna array, and transmitting the plurality of signals on the same time and frequency physical resources using the subset of the M-MIMO antenna array. The same time and frequency physical resources can correspond to one or more symbols of a multi-carrier frame and/or one or more subcarriers of the multi-carrier frame.

Figure 5:
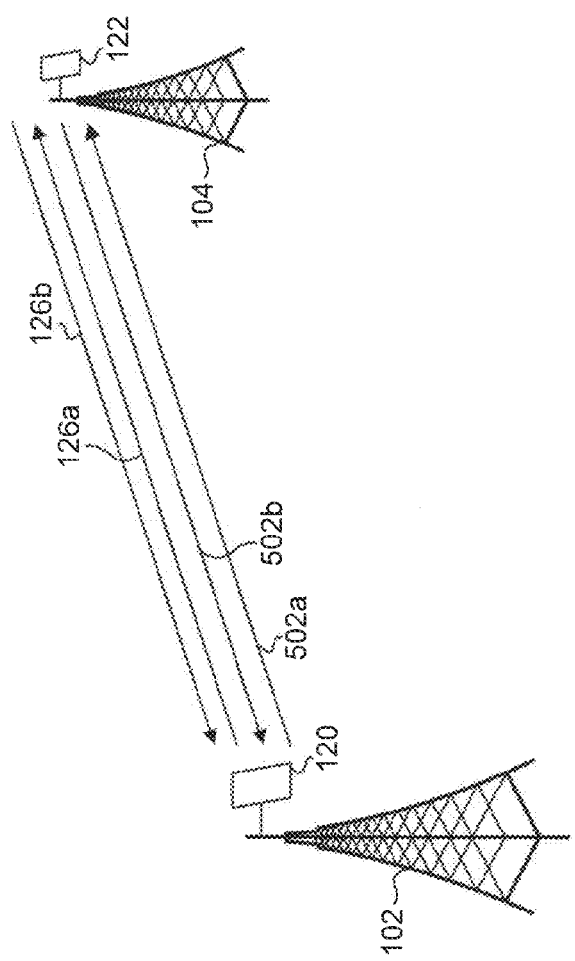
FIG. 5 illustrates another example environment in which embodiments can be implemented or practiced.

FIG. 5 illustrates another example environment 500 in which embodiments can be implemented or practiced. Example environment 500 is provided for the purpose of illustration only and is not limiting of embodiments. As shown in FIG. 5, example environment 500 includes first AP 102 and second AP 104. As in example environment 100, APs 102 and 104 use their respective M-MIMO antenna arrays 120 and 122 to establish respectively M-MIMO enabled wireless links 126a and 126b.

Additionally, APs 102 and 104 establish respectively wireless links 502a and 502b between them. In an embodiment, wireless links 126a, 126b, 502a, and 502b can all be used to transport backhaul information between APs 102 and 104. For example, for AP 102, wireless links 126a and 502a can provide a first wireless backhaul channel and a second wireless backhaul channel for sending backhaul traffic to AP 104. Similarly, wireless links 126b and 502b provide AP 104 with a first wireless backhaul channel and a second wireless backhaul channel for sending backhaul traffic to AP 102. In embodiments, the first and second wireless backhaul channels for an AP can be established simultaneously or at different times (e.g., one used as a failover channel). When established simultaneously, the two channels can use different frequency resources and/or can be spatially multiplexed if enough spatial separation exists. As described above, the first and second backhaul channels can also use the same physical resources used by the AP to serve user devices and/or to transmit to other APs.

In an embodiment, the first wireless backhaul channel is established using a first RAT and the second wireless backhaul channel is established using a second RAT. The first and second RATs can be the same or different. In an embodiment, the first and second RATs are M-MIMO RATs. Accordingly, the first wireless backhaul channel and the second wireless backhaul are each established by using a large number of antenna elements of the available M-MIMO antenna array, and high data rate beamforming can be realized over the two channels. For example, a first subset of the M-MIMO antenna array is used to establish the first wireless backhaul channel, and a second subset of the M-MIMO antenna array is used to establish the second wireless backhaul channel. The first and second subsets may or may not be overlapping. In an embodiment, the first subset of the M-MIMO antenna array is larger than the second subset of the M-MIMO antenna array. As such, the first wireless backhaul channel can be formed with narrower beams and can support higher data rates than the second wireless backhaul channel. Conversely, the second wireless backhaul channel, having wider beams (more omni-directionality), can be easier to receive by the intended AP recipient in case of partial or inaccurate channel state information and thus would have higher robustness.

In another embodiment, the first RAT is a M-MIMO RAT and the second RAT is a non-M-MIMO RAT. Accordingly, the second wireless backhaul channel is established with a few number of antenna elements (e.g., 2, 4, or 8 as in legacy RATs) of the available M-MIMO antenna array. Alternatively, the second wireless backhaul channel can be established using a non-M-MIMO antenna module of the AP. Referring to FIG. 8, the non-M-MIMO antenna module can be omni-directional antenna module 802, fixed sector omni-directional antenna module 804, or MIMO antenna module 806. Transmission over the second wireless backhaul can be omni-directional or directional using wider beam beamforming.

In an embodiment, the AP can selectively choose between the first wireless backhaul channel and the second wireless backhaul channel based on characteristics of the outgoing backhaul traffic. For example, in an embodiment, a processor (e.g., processor 202 described above in FIG. 2) of the AP can be configured to inspect outgoing backhaul traffic to determine whether the outgoing backhaul belongs to a first category or a second category. In other embodiments, more than two categories can be used as would be understood by a person of skill in the art. The first category and the second category can correspond respectively to one or more of: first and second traffic types (e.g., user data traffic and control traffic), first and second Quality of Service (QoS) levels (for data traffic), and first and second classes of service, to name a few examples.

If the outgoing backhaul traffic belongs to the first category, the AP can be configured to transmit the outgoing backhaul traffic, using the first subset of the M-MIMO antenna array and the first RAT, over the first wireless backhaul channel. For example, the outgoing backhaul traffic may include high data rate user traffic that the AP is configured to beamform using a M-MIMO RAT to the other AP. Alternatively, if the outgoing backhaul traffic belongs to the second category, the AP can be configured to transmit the outgoing backhaul traffic, using the second subset of the M-MIMO antenna array and the second RAT, over the second wireless backhaul channel. For example, the outgoing backhaul traffic may include time sensitive control information for the other AP, which the AP can be configured to transmit using a non-M-MIMO RAT for higher reliability.

Figure 6:
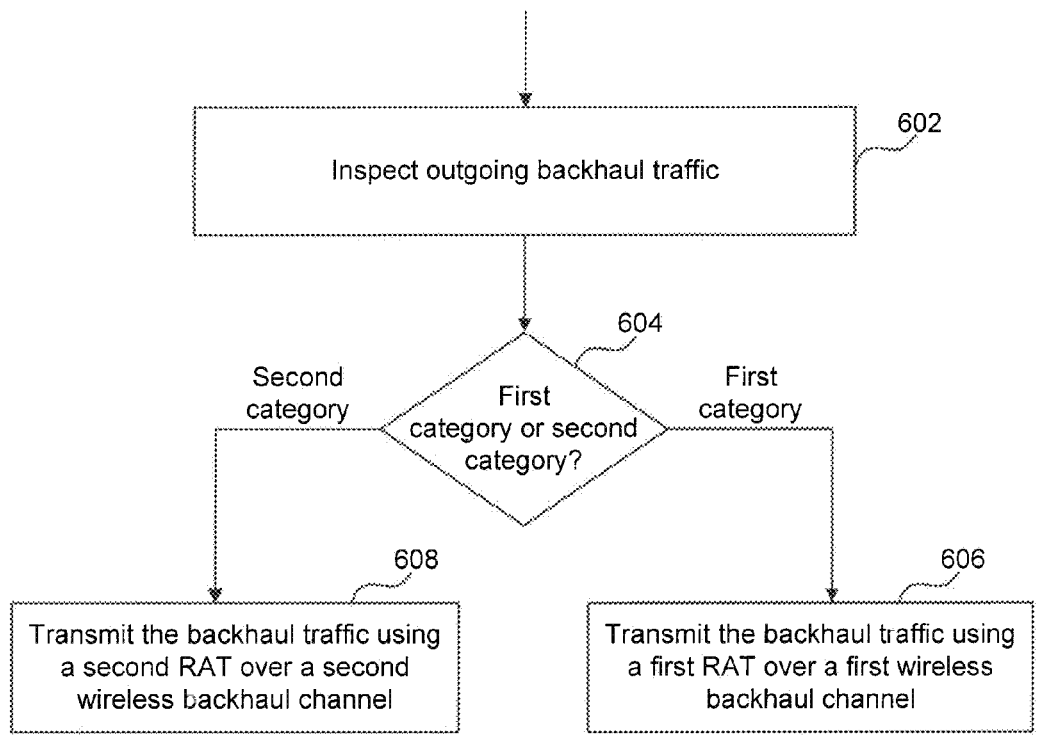
FIG. 6 illustrates another example process according to an embodiment.

FIG. 6 illustrates another example process 600 according to an embodiment. Example process 600 is provided for the purpose of illustration only and is not limiting of embodiments. Example process 600 can be performed by an AP having a M-MIMO antenna array, such as AP 102, 104, 106, or 200, for example.

As shown in FIG. 6, process 600 begins in step 602, which includes inspecting outgoing backhaul traffic to another AP. As described above, outgoing backhaul traffic for another AP can include control traffic intended for the AP and/or user data traffic intended for one or more user devices served by the other AP. Step 604 includes determining whether the outgoing backhaul traffic belongs to a first category or a second category. The first category and the second category can correspond respectively to one or more of: first and second traffic types (e.g., user data traffic and control traffic), first and second Quality of Service (QoS) levels (for data traffic), and first and second classes of service, to name a few examples.

If the outgoing backhaul traffic belongs to the first category, process 600 proceeds to step 606, which includes transmitting the backhaul traffic using a first RAT over a first wireless backhaul channel to the other AP. Alternatively, if the outgoing backhaul traffic belongs to the second category, process 600 proceeds to step 608, which includes transmitting the backhaul traffic using a second RAT over a second wireless backhaul channel to the other AP. In an embodiment, the first and second RATs are M-MIMO RATs enabled using first and second subsets respectively of the M-MIMO antenna array of the AP. In another embodiment, the first RAT is a M-MIMO RAT and the second RAT is a non-M-MIMO RAT, such as a legacy RAT.

Figure 9:
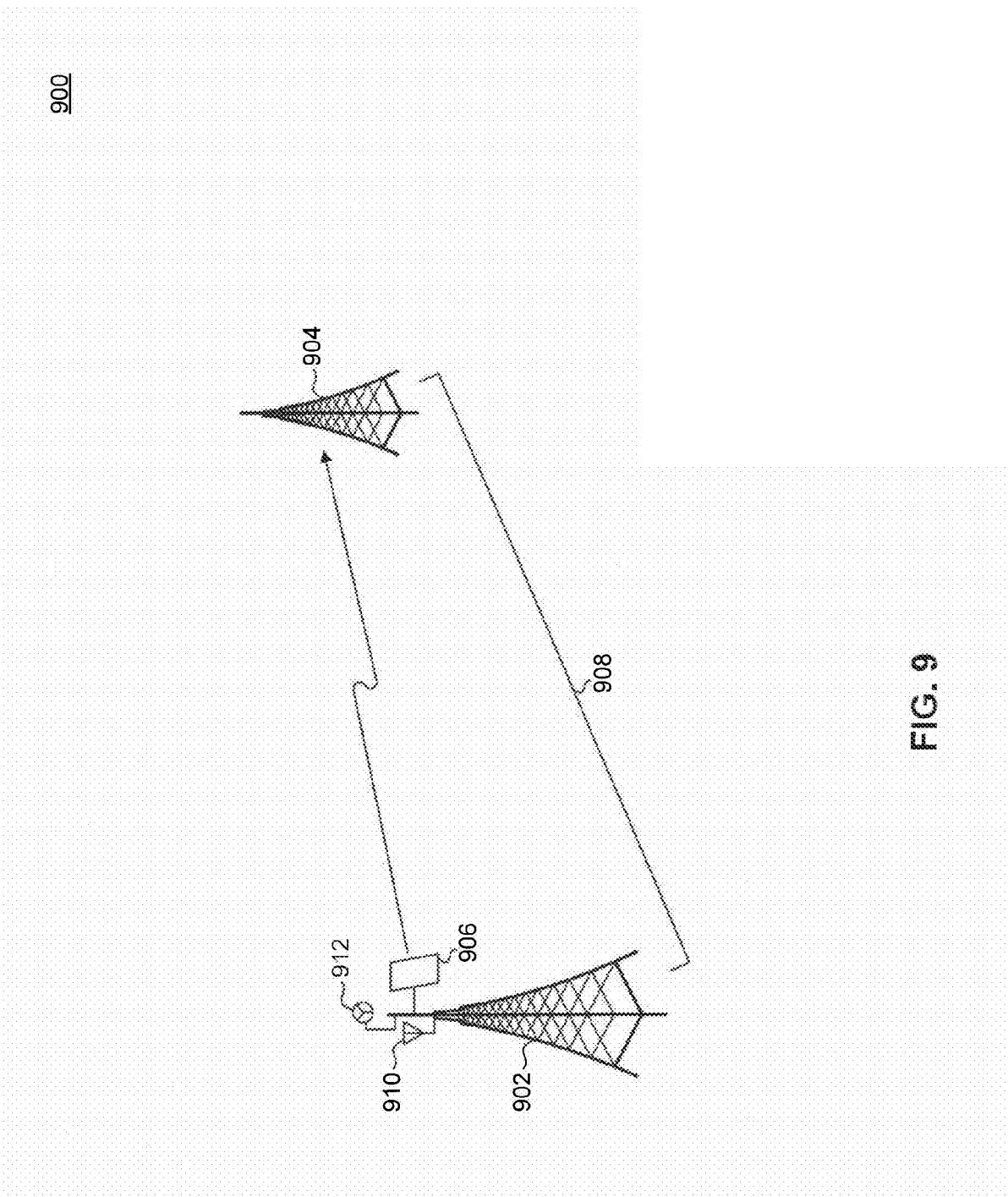
FIG. 9 illustrates another example environment in which embodiments can be implemented or practiced.

FIG. 9 illustrates another example environment 900 in which embodiments can be implemented or practiced. Example environment 900 is provided for the purpose of illustration only and is not limiting of embodiments. As shown in FIG. 9, example environment 900 includes a first AP 902 and second AP 904. For example, AP 902 can be a small cell AP (e.g., femtocell, picocell) and AP 904 can be a large cell AP (e.g., macro). However, embodiments are not limited by this example and can extend to any scenario with respect to the size of APs 902 and 904.

For the purpose of illustration only, AP operation in example environment 900 will be described from the perspective of AP 902. As would be understood by a person of skill in the art based on the teachings herein, operation at AP 904, or another AP, can be similar to the operation at AP 902, with any changes in operation being due to differences in operating conditions, AP capabilities, and/or configuration, for example. In an embodiment, AP 902 can be implemented similar to AP 200 described above in FIG. 2 but may also include additional components as further described below.

In an embodiment, AP 902 can include, without limitation, a M-MIMO antenna array 906, a non-M-MIMO antenna module 910, and a microwave transmitter 912. Non-M-MIMO antenna module 910 can include any type of antenna system that is not M-MIMO. For example, non-M-MIMO antenna module 910 can include one or more omni-directional antennas, one or more fixed sector antennas, and one or more MIMO antenna arrays.

In an embodiment, AP 902 can use M-MIMO antenna array 906, non, M-MIMO antenna module 910, and/or microwave transmitter 912 to establish one or more wireless backhaul channels to AP 904, to another AP, and/or to a core network entity. In an embodiment, the ability of AP 902 to establish a given wireless backhaul channel to AP 904 using a particular antenna system depends on the distance of AP 904 from AP 902, line of sight availability between AP 902 and 904, and/or channel conditions between AP 902 and 904. For example, a microwave wireless backhaul channel typically requires line of sight between AP 902 and 904. A M-MIMO wireless backhaul channel can benefit from a slow changing channel between 902 and 904 such that the channel conditions can be tracked. An omni-directional antenna system typically has a maximum omni-directional range within which a transmitted signal can be adequately received. As would be understood by a person of skill in the art based on the teachings herein, embodiments are not limited to establishing wireless backhaul channels to other APs. For example, wireless backhaul channels can also be established to core network entities according to embodiments.

In addition to the wireless antenna systems described above, in another embodiment, AP 902 can also include a wired transmitter (e.g., coaxial RF transmitter, optical transmitter, etc.) (not shown in FIG. 9) to enable a wired backhaul link 908 to AP 904. In another embodiment, AP 902 can, additionally or alternatively, have a direct wired backhaul channel to a core network entity, such as base station control & gateway systems 714 described in FIG. 7 above.

As would be understood by a person of skill in the art based on the teachings herein, in other embodiments, AP 902 can include only some of M-MIMO antenna array 906, non-M-MIMO antenna module 910, microwave transmitter 912, and the wired transmitter. For example, AP 902 may include only M-MIMO antenna array 906 and non-M-MIMO antenna module 910. Alternatively, AP 902 may include only M-MIMO antenna array 906 and the wired transmitter for enabling wired backhaul link 908. In other embodiments, AP 902 can include one or more of each of the components described above. For example, AP 902 can include more than one wired transmitters to enable more than one wired backhaul links 908 to different entities. Similarly, AP 902 may include more than one M-MIMO antenna array 902, non-M-MIMO antenna module 910, and/or microwave transmitter 912.

In an embodiment, when backhaul traffic is available for transmission, AP 902 is configured to identify available backhaul channels for transmitting the backhaul traffic. As used herein, available backhaul channels refers to backhaul channels that exist (e.g., wired links) or that can be established (e.g., wireless links), regardless of the current utilization of the channel. In an embodiment, AP 902 selects a destination AP (or core network entity) for the backhaul traffic and identifies the available backhaul channels from available backhaul channels to the destination AP (or core network entity). The destination AP (or core network entity) as used herein corresponds to an AP (or core network entity) that is one hop away from AP 902. In an embodiment, AP 902 can select the destination AP (or core network entity) based on current load information of available APs (and/or core network entities), e.g., selecting the AP with the lowest traffic load to ensure load balancing across the network. In another embodiment, selection between one AP or another as destination AP may be based on the speed and/or latency of the backhaul link of the destination AP (e.g., next hop for the backhaul traffic).

In another embodiment, AP 902 can have a default destination AP or core network entity for its backhaul traffic, which is used whenever available. In another embodiment, AP 902 identifies the available backhaul channels across all neighboring APs and/or core network entities. For example, AP 902 may identify available backhaul channels to AP 904 and to another neighboring AP (not shown in FIG. 9), and then select one or more backhaul channels from the available backhaul channels.

As described, available backhaul channels to AP 902 can include in embodiments one or more of: a coaxial channel, a fiber optic channel, a wireless microwave channel, a wireless omni-directional channel, a wireless fixed sector channel, a wireless beamformed channel, a wireless MIMO channel, and a wireless M-MIMO channel. These channels can be established by AP 902 with one or more APs and/or one or more core network entities as described above.

In an embodiment, AP 902 selects a backhaul channel from among the available backhaul channels based on one or more of: capacity of the available backhaul channels, a traffic category of the backhaul traffic, user traffic requirements at AP 902, availability of transmitter/transmit antenna systems at AP 902, availability of corresponding receiver/receive antennas systems at potential destination nodes of the backhaul traffic (e.g., AP or core network entity), backhaul link speed/latency at potential destination nodes, channel conditions, and/or power considerations. In an embodiment, AP 902 operates according to a stored configuration which includes selection rules that govern the selection process. The stored configuration can be fixed or adaptable as further described below.

For example, in an embodiment, AP 902 may have available M-MIMO antenna array 906, which it can use to establish a wireless M-MIMO channel to AP 904, and a wired transmitter that enables wired backhaul link 908 to AP 904. In an embodiment, beamforming can be used on the wireless M-MIMO channel, resulting in a larger data rate on the wireless M-MIMO channel than wired backhaul link 908.

An example backhaul selection rule can include selecting wired backhaul link 908 by default if the QoS requirements can be satisfied using wired backhaul link 908. Otherwise, the wireless M-MIMO channel is established and used to transmit the backhaul traffic. Another example backhaul selection rule can include selecting the wireless M-MIMO channel by default as long as a number of UEs served using M-MIMO antenna array 906 is below a predefined number. Otherwise, wired backhaul link 908 is used to transmit the backhaul traffic. A further backhaul selection rule can include selecting the wireless M-MIMO channel by default as long as channel conditions between AP 902 and AP 904 are relatively constant or slowly changing. Otherwise, wired backhaul link 908 is used to transmit the backhaul traffic. As would be understood by a person of skill in the art based on the teachings herein, embodiments are not limited to these examples. In other embodiments, the selection can include selecting between more than two available backhaul channel options and can include more than one selection rule used in conjunction with each other. Other considerations can also be used in the selection as described above and as would be understood by a person of skill in the art based on the teachings herein.

Once a backhaul channel is selected as described above, AP 902 can transmit the backhaul traffic over the selected backhaul channel. For example, if the selected charnel is a wireless M-MIMO channel, then AP 902 can transmit the backhaul traffic using M-MIMO antenna array 906. If the selected channel is a wireless non-M-MIMO channel (e.g., MIMO, omni-directional, etc.), then AP 902 can transmit the backhaul channel using non-M-MIMO antenna module 910.

It is noted that backhaul channel selection can be done by an AP 902 on a half-duplex or a full duplex basis. In the half-duplex case, AP 902 determines only the backhaul channel for uplink backhaul traffic (e.g., from AP 902 to AP 904). In the full duplex case, AP 902 can determine the backhaul channel for uplink backhaul traffic as well as determine aspects of the backhaul channel for downlink backhaul traffic. The uplink and downlink backhaul channels may or may not be the same with respect to any aspect of the channels (e.g., RAT, wireless/wired, M-MIMO/MIMO/omni, etc.). In an embodiment, AP 902 can determine any aspect of the downlink backhaul channel in the same manner as done for the uplink backhaul channel. In another embodiment, only some aspects of the downlink backhaul channel can be determined by AP 902. For example, AP 902 may select only whether the downlink backhaul channel is wired or wireless, and/or whether a wireless downlink backhaul channel is M-MIMO or not.

Figure 10:
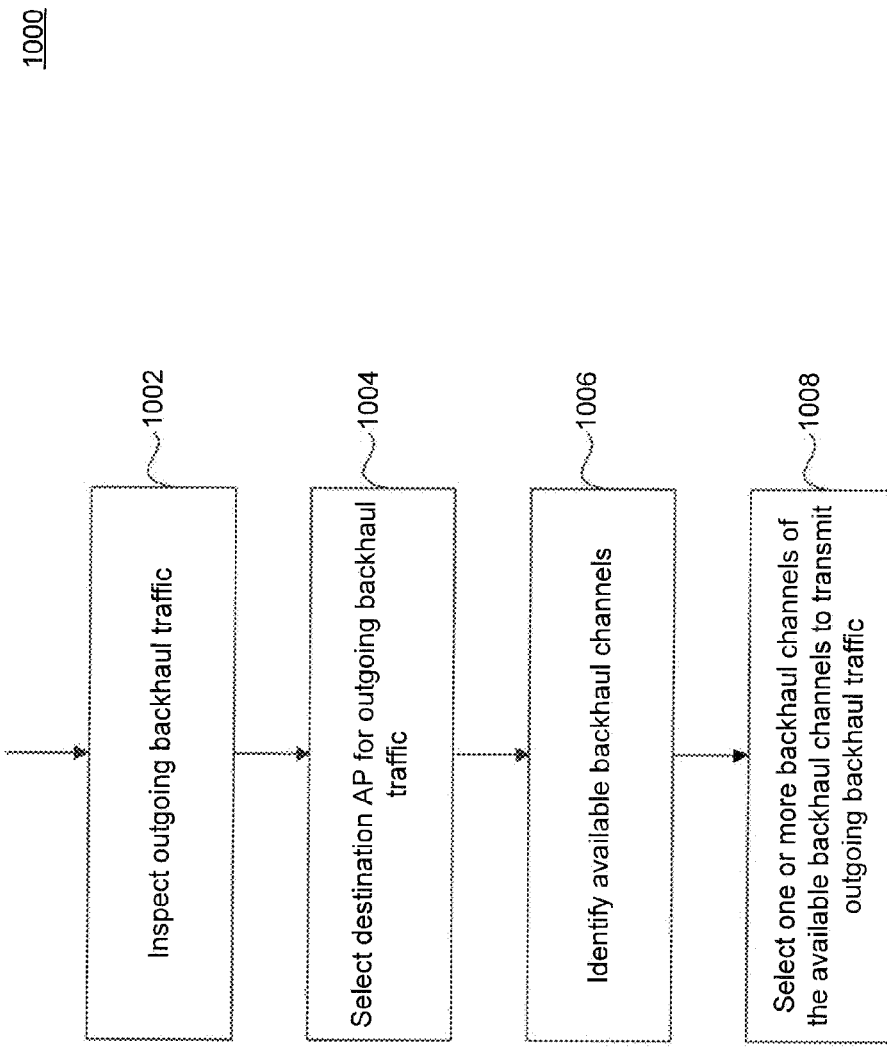
FIG. 10 illustrates another example process according to an embodiment.

FIG. 10 illustrates an example process 1000 according to an embodiment. Example process 1000 is provided for the purpose of illustration only and is not limiting of embodiments. Example process 1000 can be performed by an AP, such as AP 102, AP 200, or AP 902, for example.

As shown in FIG. 10, example process 1000 begins in step 1002, which includes inspecting outgoing backhaul traffic. In an embodiment, step 1002 includes inspecting outgoing backhaul traffic to identify a category of the backhaul traffic. In an embodiment, as described above, the category of the backhaul traffic can be based on the type of traffic carried by the backhaul traffic, a QoS level of the backhaul traffic, and/or a class of service associated with the backhaul traffic.

Subsequently, process 1000 proceeds to step 1004, which includes selecting a destination AP for the outgoing backhaul traffic. In another embodiment, process 1000 does not include step 1004, and processing proceeds to step 1006. The destination AP corresponds to an AP that is one hop away from the AP performing step 1000 and to which the backhaul traffic is to be transmitted. In an embodiment, step 1004 includes selecting the destination AP based on current load information of available APs, e.g., selecting the AP with the lowest traffic load to ensure load balancing across the network. In another embodiment, selection between one AP or another as destination AP may be based on the speed and/or latency of the backhaul link of the destination AP (e.g., next hop for the backhaul traffic). In another embodiment, a default destination AP is selected in step 1004.

Then, in step 1006, process 1000 includes identifying available backhaul channels. In an embodiment, step 1006 includes identifying available backhaul channels to the destination AP selected in step 1004. In another embodiment, where step 1004 is skipped, process 1006 includes identifying available backhaul channels across all neighboring APs. As described, available backhaul channels to can include one or more of: a coaxial channel, a fiber optic channel, a wireless microwave channel, a wireless omni-directional channel, a wireless fixed sector channel, a wireless beamformed channel, a wireless MIMO channel, and a wireless M-MIMO channel.

Process 1000 terminates in step 1008, which includes selecting one or more backhaul channels of the available backhaul channels to transmit the outgoing backhaul traffic. In an embodiment, step 1008 includes selecting a backhaul channel from among the available backhaul channels based on one or more of: capacity of the available backhaul channels, a traffic category of the backhaul traffic, user traffic requirements at the AP, availability of transmitter/transmit antenna systems at the AP, availability of corresponding receiver/receive antennas systems at potential destination nodes of the backhaul traffic (e.g., AP or core network entity), backhaul link speed/latency at potential destination nodes, channel conditions, and/or power considerations.

In an embodiment, as described above, the AP can operate according to a stored configuration which includes selection rules that govern the backhaul channel selection process. The stored configuration can be fixed or adaptable as further described below with reference to FIG. 11, which illustrates an example environment 1100 according to an embodiment.

Figure 11:
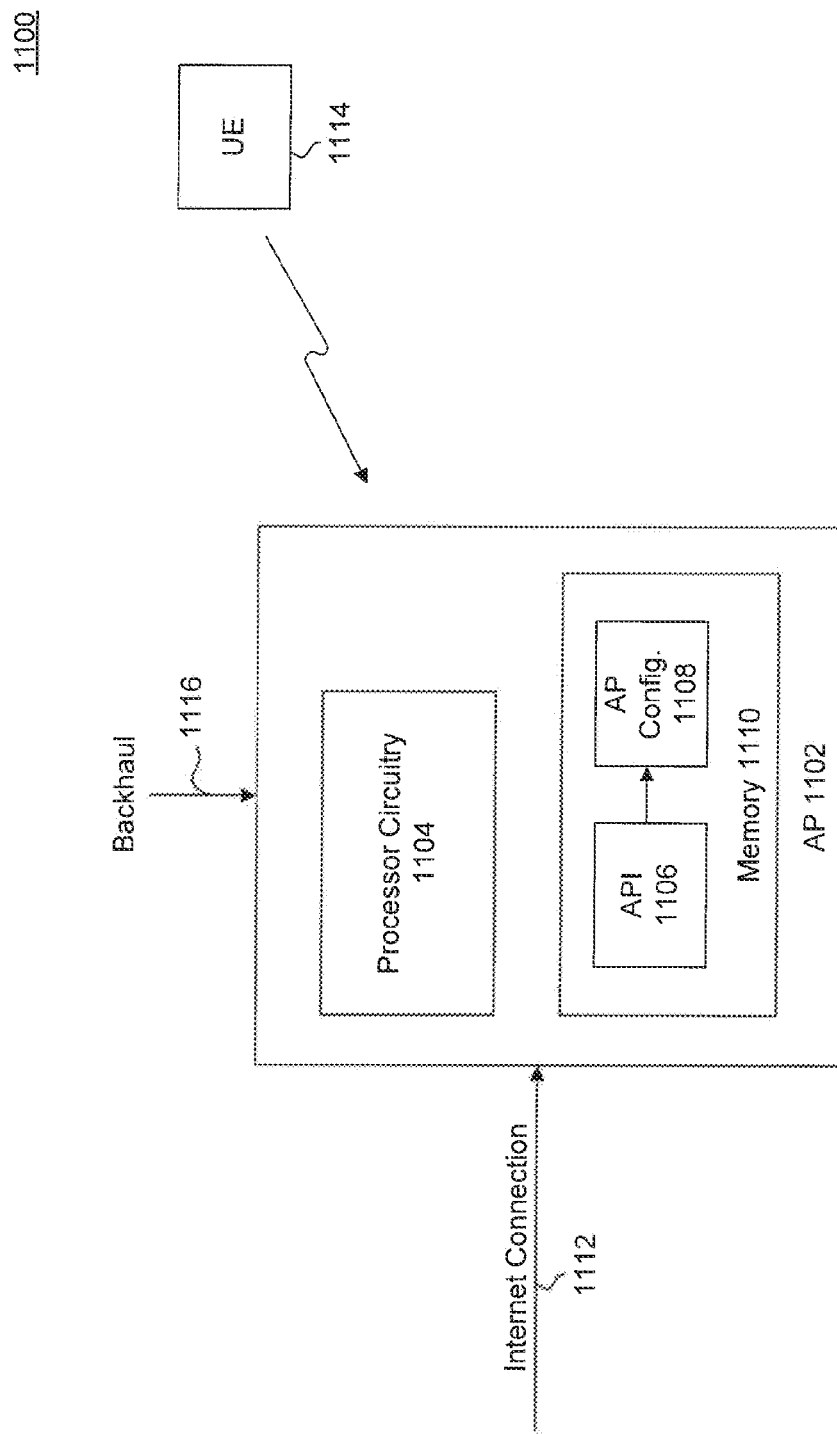
FIG. 11 illustrates another example environment in which embodiments can be implemented or practiced.

As shown in FIG. 11, example environment 1100 includes an AP 1102 and a UE 1114 in a vicinity of AP 1102. AP 1102 includes, without limitation, processor circuitry 1104 and a memory 1110. In an embodiment, memory 1110 includes Application Programming Interface (API) logic instructions 1106 that, when executed by processor circuitry 1104, provide an API for accessing and modifying an AP configuration 1108. AP configuration 1108 can include, among other things, a backhaul management configuration that governs backhaul traffic management by AP 1102, including backhaul channel selection as described above.

In an embodiment, AP configuration 1108 can be accessed and modified remotely via the API enabled by processor circuitry 1104. For example, in an embodiment, UE 1114 can wirelessly transmit an API call to the API, e.g., using a mobile application, to access and modify AP configuration 1108. In another embodiment, AP configuration 1108 can be accessed and modified using the API via an Internet connection 1112 of AP 1102 or a backhaul link 1116 of AP 1102.

Figure 12:
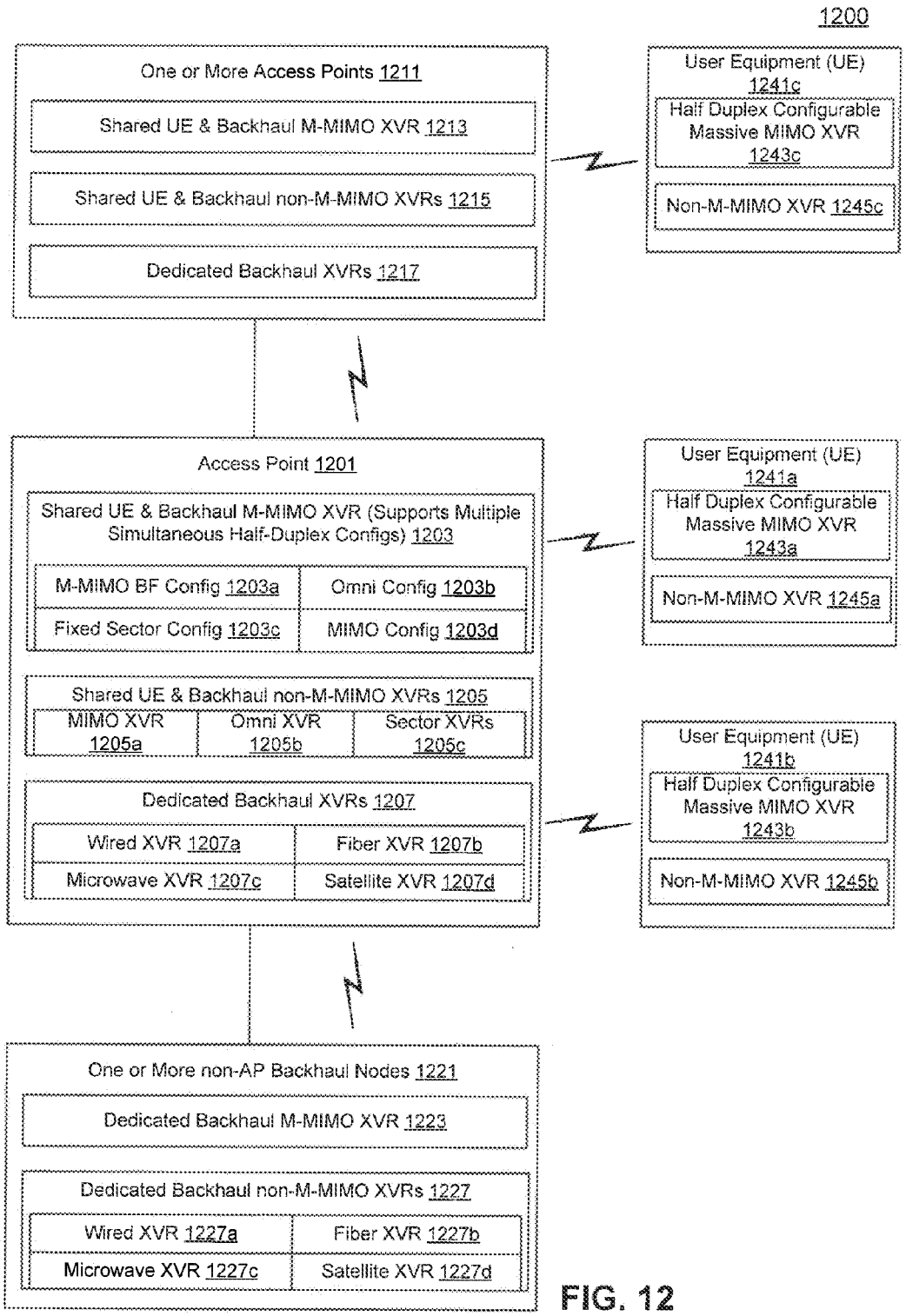
FIG. 12 illustrates another example environment in which embodiments can be implemented or practiced.

FIG. 12 illustrates another example environment 1200 in which embodiments can be implemented or practiced. Example environment 1200 is provided for the purpose of illustration only and is not limiting of embodiments. As shown in FIG. 12, example environment 1200 includes an AP 1201 and one or more other APs 1211 (e.g., neighboring APs) that utilize shared UE and backhaul communication pathways. In addition, backhaul communication can also flow through one or more non-AP backhaul nodes 1221, which do not directly support underlying UE communications. Instead, the nodes 1221 provide relay and bridging functionality supporting backhaul flow. The AP 1201 supports a plurality of underlying UEs such as UE 1241a and UE 1241b. Likewise, the one or more APs 1211 also support one or pluralities of UEs such as UE 1241c.

The AP 1201 as illustrated contains a shared UE & Backhaul M-MIMO transceiver 1203 which is associated with a M-MIMO antenna array (not shown). The access point 1201 selectively configures and employs the M-MIMO transceiver 1203 to support communication with a M-MIMO transceiver 1213 and the UEs 1241a and 1241b. Such configuration may be managed independently by the AP 1201 or performed via coordination with the one or more APs 1211. Whether via coordination or via responsive evaluation, the one or more APs 1211 similarly configures its M-MIMO transceiver 1213 to support the backhaul flow from the AP 1201 while still supporting the UE 1241c.

Similarly, backhaul flow need not only involve AP to AP flow, but also AP to non-AP node flows. For example, if the one or more APs 1211 comprise backhaul end-point nodes, they would exchange all of their backhaul flow with the AP 1201. In addition to servicing its own backhaul flow, the AP 1201 would relay or bridge the backhaul flow of the AP 1211 to support both first pathway(s) with the one or more non-AP backhaul nodes 1221 and second pathway(s) to the UEs 1241a and 1241b.

Not all backhaul flow between the one or more APs and the one or more nodes 1221 needs to pass through the AP 1201. Some may do so and some may span directly or via other nodes and APs. For example, video traffic might flow directly while non-streaming data might flow indirectly via the AP 1201. In other words, based on, for example, data type, quality of service needs, loading and other link conditions, user account authorizations and capabilities, current configurations and permitted adaptations, various single and multiple backhaul linkages may be selectively established among all of the APs 1211, AP 1201 and the nodes 1221. Such backhaul linkages can adapt over time on a half duplex basis to meet underlying needs and conditions.

Specifically, the AP 1201, which is adapted to include the shared UE and backhaul M-MIMO transceiver 1203 may also include various other shared UE and backhaul non-M-MIMO transceivers 1205 as well as dedicated backhaul transceivers 1207. Although not shown, dedicated UE transceivers could also be included within the AP 1201. With such overall configuration, the AP 1201 can make more inclusive decisions as to which of the available transmitter and receiver pathways to use to service backhaul and UE needs.

For example, to support UE 1241*a*, e.g., a smartphone with a premium account of a first user, requests for delivering a streaming video (captured by the first user via the UE 1241*a* to a second user of the UE 1241*c*) might begin to be serviced via a beam formed link between the AP 1201 to one of the APs 1211. For a third user of the UE 1241*b* attempting the same type of transfer but without the premium account, one of dedicated backhaul transceivers 1207 might be initially selected. Such choices might be made to provide better performance for the first user over that of the second. The better performance (i.e., quality of service) might be a result of the current loading conditions, for example, wherein the selected one of the dedicated backhaul transceivers 1207 is exhibiting heavy loading and relatively inferior performance to that of the beam formed path via the transceiver 1203. Over time, performance on one or both of such backhaul pathways change so much that the dedicated pathway proves superior. As this occurs, the AP 1201 may choose to swap the pathways for user servicing to maintain the higher quality performance for the UE 1241*a*. Alternatively, both streams might be merged to a single pathway if channel conditions so support or justify.

Of course, many other adaptations are also possible. The AP 1201 can define UE and backhaul pathway configurations that span all traffic needs. That is, all data types and UEs may be serviced by a selected single backhaul transceiver pathway and service all UEs via a single transceiver servicing UE access. The AP 1201 can also select any number of backhaul transceivers to support any one or number of UE backhaul needs, while selecting any number of transceivers to support UE access. Further granularity, as mentioned above, can span to data type and even further to data type needs (perhaps as defined by a software application or App). Thus, a single UE may have many simultaneous data flow demands, each having different data types and backhaul requirements, which can be serviced by an equal number of backhaul transceivers, configurations and pathways.

Any transceiver that services both backbone and UE traffic can do so via simultaneous, frequency divided or time shared resource allocations between the two and through use of caching as may be needed. For example, the M-MIMO transceiver 1203 might be configured to simultaneously support backhaul and UE communication flow. This can be done by allocating antenna resources, through frequency division, and time domain duplexing. For example, the M-MIMO transceiver 1203 might support a M-MIMO beam forming configuration 1203*a*, omni-directional configuration 1203*b*, fixed sector configuration 1203*c*, MIMO configuration 1203*d*, and so on. Such plurality of M-MIMO transceiver configuration data is stored within memory (not shown) of the AP 1201. The memory also storing computer instructions or program code defining operation of the AP 1201. Also, although not shown, processing circuitry, e.g., a processor, consumes such instructions and accesses such configurations to carry out the functionality described herein. Also, the configuration information and instructions can be fully integrated or stored separately at least in part.

Various configurations can be selected and can be adapted through switching on the fly between configurations. Configurations can apply to the entire attached M-MIMO antenna array (not shown) but could also apply to a subset thereof. In other words, the single M-MIMO transceiver 1201 might be configured to support multiple configurations at the same time via allocation of M-MIMO antenna resources to particular configurations. Otherwise, such configurations can be allocated via time sharing and on a need based and priority basis of underlying communication flow and cache content.

To provide further offloading and UE and backhaul flow management, the various other non-M-MIMO transceivers 1205 and associated antenna infrastructure (not shown) can be utilized. For example, a set of independent MIMO antennas and associated MIMO transceiver 1205*a*, an omni-directional transceiver 1205*b* and fixed sector transceivers 1205*c* might be integrated to allow the AP 1201 further UE and backhaul flow options. Similarly, other backhaul options can integrated as illustrated by the dedicated backhaul transceivers 1207 such as the wired transceiver 1207*a*, fiber transceiver 1207*b*, microwave transceiver 1207*c*, and satellite transceiver 1207*d*.

Thus, optimal overall backhaul and UE flow configurations can be selected, deployed and updated on the fly via processing circuitry within the AP 1201. Such overall configurations involve the selection of configurations and resource allocations for each of the adaptable M-MIMO transceiver 1203 (which can be configured on the fly selectively to service none, one, many or all of the numerous backhaul and UE flows), the non-M-MIMO transceivers 1205 (which can be similarly selectively employed in independent and shared manners), and the dedicated backhaul transceivers 1207 (which can selectively employed when beneficial to support none, particular parts of or all backhaul flow).

As mentioned above, the processing circuitry of the AP 1201 (not shown) may coordinate with other of the one or more APs 1211 and the other one or more nodes 1221 for making all or any portion of the overall backhaul and UE flow configurations. In addition, although not shown, an independent central service, e.g., a server or server infrastructure, might assist or fully manage such coordination and may even be configured to perform all or a portion of the underlying decision configuration and adaption decision making. Adaptation decision making involving not only determining that current configurations are less than optimal, but also identifying and selecting configuration changes and scheduling and managing the configuration switchover.

Although choosing a configuration (whether via coordination with other nodes, APs or central service) might involve full duplex allocations, backhaul flow can also be managed as mentioned previously on a half-duplex basis. That is, communication from a UE and through a backhaul ("outgoing flow") can be managed independently from communication through a backhaul to a UE ("incoming flow"). If so managed, the outgoing flow and incoming flows need not share backhaul or access pathways. Alternatively, both incoming and outgoing flow can share one or both of the backhaul and access pathways.

The one or more APs 1211 may also be configured with a shared UE and backhaul M-MIMO transceiver 1213 which operates as described in reference to the AP 1201. It may also include shared non-M-MIMO transceivers 1205 (similar to that of the transceivers 1205) and dedicated backhaul transceivers 1215 (similar to that of the transceivers 1207). Likewise, the backhaul nodes 1221 may be configured to support only backhaul flow via a dedicated backhaul M-MIMO transceiver 1223 and dedicated backhaul non-M-MIMO transceivers 1227, the latter including, for example, a wired transceiver 1227*a*, fiber transceiver 1227*b*, microwave transceiver 1227*c* and satellite transceiver 1227*d*.

Thus, it can be appreciated that managing configurations of the AP 1201 might involve underlying processing circuitry making localized configuration decisions with only next hop link knowledge. It can be extended to accommodate coordination. In other embodiments, further extensions may span the entire network. That is, making end to end data flow decisions for backhaul and UE pathway configuration and selection based on the conditions of the entire network (or at least the entire network pathway from two end point devices, e.g., between two distant UEs or server and UE). In this way, a particular backhaul choice for a particular App might be selected based on local and competing UE loading, other communication demands within the source UE, all first hop backhaul linkage conditions and capabilities, intermediate backhaul hop pathway, and destination UE counterpart demands and network status and limitations. In other words, coordination might involve a node or AP only one hop away or might involve coordination based on details of the entire pathway of nodes and APs between end point devices.

Further complexities in UE and backhaul pathway decision making occurs in embodiments wherein UEs have multiple transceivers of differing types built therein such as the illustrated UEs 1241a, 1241b and 1241c. As illustrated, access pathways can be established via one or both of the half-duplex configurable massive MIMO transceivers 1243a, 1243b and 1243c and non-massive MIMO transceivers 1245a, 1245b and 1243c. With such capabilities, both backhaul and access pathways can be selected and adapted in concert for all UEs, each UE, or each data flow associated with a particular App (software application) running on a particular UE.

Although not shown, all of the transceivers illustrated in FIG. 12 comprise transceiver circuitry which is composed of both receiver and transmitter circuitry. Such transceiver circuitry is coupled to processing circuitry and to either antenna assemblies or wired or fiber as described above.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. An Access Point (AP), comprising:
a Massive Multiple Input Multiple Output (M-MIMO) antenna array; and
a processor configured to:
generate a first symbol stream comprising user data for a user device;
generate a second symbol stream comprising backhaul information for another AP;
determine a transmit precoder matrix;
pre-code the first symbol stream and the second symbol stream using the transmit precoder matrix to generate a plurality of signals; and
couple the plurality of signals to the M-MIMO antenna array to transmit a first beam for the first symbol stream to the user device and a second beam for the second symbol stream to the another AP,
wherein the transmit precoder matrix is determined, based on a concatenated channel formed by concatenating a first channel estimate and a second channel estimate such that the second beam is narrower than the first beam, and
wherein a row of zeros is added to either the first channel estimate or the second channel estimate prior to the first channel estimate and the second channel estimate being concatenated to form the concatenated channel.

2. The AP of claim 1, wherein the first channel estimate is a first channel from the AP to the user device, and the second channel estimate is a second channel from the AP to the another AP.

3. The AP of claim 1, wherein the processor is configured to determine the transmit precoder matrix such that transmission of the plurality of signals by the M-MIMO antenna array results in the first symbol stream being beamformed to the user device and the second symbol stream being beamformed to the another AP.

4. The AP of claim 1, further comprising:
a switching module, coupled between the processor and the M-MIMO antenna array,
wherein the processor is further configured to select a subset of the M-MIMO antenna array, and to control the switching module to couple the plurality of signals to respective antenna elements of the subset of the M-MIMO antenna array.

5. The AP of claim 4, wherein the subset of the M-MIMO antenna array is configured to transmit the plurality of signals on same time and frequency physical resources.

6. The AP of claim 5, further comprising:
a multi-carrier modulator,
wherein the processor is configured to control the multi-carrier modulator to modulate the plurality of signals onto the same time and frequency physical resources.

7. The AP of claim 6, wherein the same time and frequency physical resources correspond to one or more symbols of a multi-carrier frame.

8. The AP of claim 6, wherein the same time and frequency physical resources correspond to one or more subcarriers of a multi-carrier frame.

9. A method performed by an Access Point (AP) having a Massive Multiple Input Multiple Output (M-MIMO) antenna array, the method comprising:
generating a first symbol stream comprising user data for a user device;
generating a second symbol stream comprising backhaul information for another AP;
determining a transmit precoder matrix;

pre-coding the first symbol stream and the second symbol stream using the transmit precoder matrix to generate a plurality of signals; and coupling the plurality of signals to the M-MIMO antenna array to transmit a first beam for the first symbol stream to the user device and a second beam for the second symbol stream to the another AP, wherein the transmit precoder matrix is determined, based on a concatenated channel formed by concatenating a first channel estimate and a second channel estimate such that the second beam is narrower than the first beam, and wherein a row of zeros is added to either the first channel estimate or the second channel estimate prior to the first channel estimate and the second channel estimate being concatenated to form the concatenated channel.

10. The method of claim 9, wherein the first channel estimate is a first channel from the AP to the user device, and the second channel estimate is a second channel from the AP to the another AP.

11. The method of claim 9, wherein determining the transmit precoder matrix comprises determining the transmit precoder matrix such that transmission of the plurality of signals by the M-MIMO antenna array results in the first symbol stream being beamformed to the user device and the second symbol stream being beamformed to the another AP.

12. The method of claim 9, further comprising:
selecting a subset of the M-MIMO antenna array; and
coupling the plurality of signals to respective antenna elements of the subset of the M-MIMO antenna array.

13. The method of claim 12, wherein the plurality of signals are transmitted on same time and frequency physical resources using the subset of the M-MIMO antenna array.

14. The method of claim 13, further comprising:
modulating the plurality of signals onto the same time and frequency physical resources.

15. The method of claim 14, wherein the same time and frequency physical resources correspond to one or more symbols of a multi-carrier frame.

16. The method of claim 14, wherein the same time and frequency physical resources correspond to one or more subcarriers of a multi-carrier frame.

17. A system, comprising:
a first Access Point (AP); and
a second AP comprising a processor configured to:
generate a first symbol stream comprising user data for a user device;
generate a second symbol stream comprising backhaul information for the first AP;
determine a transmit precoder matrix;
pre-code the first symbol stream and the second symbol stream using the transmit precoder matrix to generate a plurality of signals; and
couple the plurality of signals to an antenna array to transmit a first beam for the first symbol stream to the user device and a second beam for the second symbol stream,
wherein the transmit precoder matrix is determined, based on a concatenated channel formed by concatenating a first channel estimate and a second channel estimate such that the second beam is narrower than the first beam, and
wherein a row of zeros is added to either the first channel estimate or the second channel estimate prior to the first channel estimate and the second channel estimate being concatenated to form the concatenated channel.

18. The system of claim 17, wherein the first channel estimate is a first channel from the second AP to the user device, and the second channel estimate is a second channel from the second AP to the first AP.

19. The system of claim 17, wherein the processor is configured to determine the transmit precoder matrix such that transmission of the plurality of signals by the antenna array results in the first symbol stream being beamformed to the user device and the second symbol stream being beamformed to the first AP.

20. The system of claim 17, wherein the second AP further comprises:
a switching module, coupled between the processor and the antenna array,
wherein the processor is further configured to select a subset of the antenna array, and to control the switching module to couple the plurality of signals to respective antenna elements of the subset of the antenna array.

21. The system of claim 20, wherein the subset of the antenna array is configured to transmit the plurality of signals on same time and frequency physical resources.

22. The system of claim 21, wherein the second AP further comprises:
a multi-carrier modulator,
wherein the processor is configured to control the multi-carrier modulator to modulate the plurality of signals onto the same time and frequency physical resources.

23. The system of claim 22, wherein the same time and frequency physical resources correspond to one or more symbols of a multi-carrier frame.

24. The system of claim 22, wherein the same time and frequency physical resources correspond to one or more subcarriers of a multi-carrier frame.

25. An Access Point (AP), comprising:
a Massive Multiple Input Multiple Output (M-MIMO) antenna array; and
a processor configured to pre-code a first symbol stream and a second symbol stream using a transmit precoder matrix to generate a plurality of signals and couple the plurality of signals to the M-MIMO antenna array to transmit a first beam for the first symbol stream and a second beam for the second symbol stream,
wherein the first symbol stream comprises user data for a user device and the second symbol stream comprises backhaul information for another AP,
wherein the transmit precoder matrix is determined, based on a concatenated channel formed by concatenating a first channel estimate and a second channel estimate such that the second beam is narrower than the first beam, and
wherein a row of zeros is added to either the first channel estimate or the second channel estimate prior to the first channel estimate and the second channel estimate being concatenated to form the concatenated channel.

26. The AP of claim 25, wherein the first channel estimate is a first channel from the AP to the user device, and the second channel estimate is a second channel from the AP to the another AP.

27. The AP of claim 25, wherein the processor is configured to determine the transmit precoder matrix such that transmission of the plurality of signals by the M-MIMO antenna array results in the first symbol stream being beamformed to the user device and the second symbol stream being beamformed to the another AP.

28. The AP of claim 25, further comprising:
a switching module, coupled between the processor and the M-MIMO antenna array, wherein the processor is further configured to select a subset of the M-MIMO antenna array, and to control the switching module to couple the plurality of signals to respective antenna elements of the subset of the M-MIMO antenna array.

29. The AP of claim 28, wherein the subset of the M-MIMO antenna array is configured to transmit the plurality of signals on same time and frequency physical resources.

* * * * *